(No Model.)

M. KRAKER.
FILTER.

No. 509,741. Patented Nov. 28, 1893.

Witnesses,

Inventor,
Michael Kraker
By Dewey & Co.
atty

UNITED STATES PATENT OFFICE.

MICHAEL KRAKER, OF SAN FRANCISCO, CALIFORNIA, ASSIGNOR TO THE ACME FILTER COMPANY, OF SAME PLACE.

FILTER.

SPECIFICATION forming part of Letters Patent No. 509,741, dated November 28, 1893.

Application filed February 26, 1892. Renewed February 15, 1893. Serial No. 462,504. (No model.)

*To all whom it may concern:*

Be it known that I, MICHAEL KRAKER, of San Francisco, in the county of San Francisco and State of California, have invented certain new and useful Improvements in Filters; and I do hereby declare that the following is a full, clear, and exact description of the same, reference being had to the accompanying drawings, forming a part of this specification.

My invention relates to appliances for separating solid impurities and other substances from water and other liquids, and the objects and nature of my invention will appear from the ensuing description, taken in connection with the accompanying drawings, in which—

Figure 1:
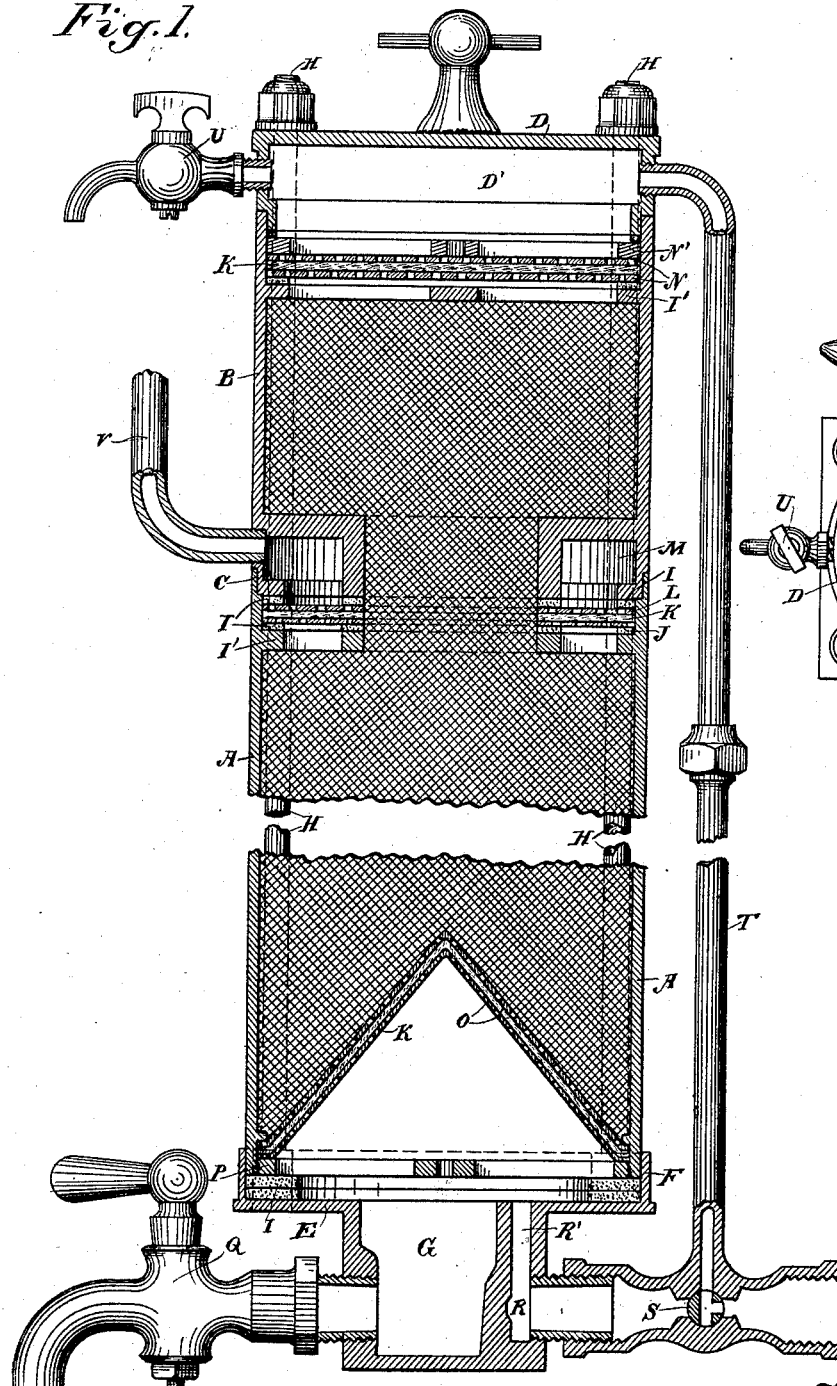
Figure 2:
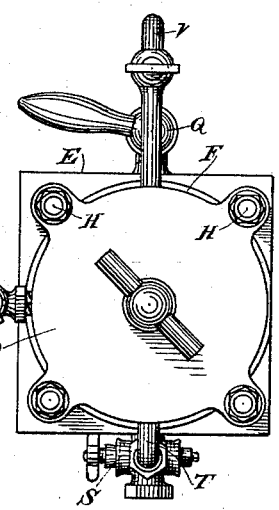

Figure 1 is a central transverse vertical section of a filter embodying my invention, and Fig. 2 is a plan view of the same.

In the said drawings A designates the shell or casing of the filter, this shell being oblong and vertical and having its bottom closed by a bottom piece E, and provided at its top with a top piece or cap D, which is removable. Suitable vertical tie-rods H connect the top and bottom pieces D and E and retain them in proper connection with the filter-casing A. Within the lower end of the casing A is placed a conical screen the apex of which extends upward into the casing, and within the upper end of said casing is placed a flat screen; a space D' being left above the upper screen and a space being also left below the lower screen. The interior of the casing, between these lower and upper screens, is filled with a single continuous mass of powdered charcoal or other suitable filtering material. At a point intermediate of the upper and lower screens the filtering chamber communicates with a chamber M for filtered water, this chamber being shown as placed within the filter-casing A about midway between the lower and upper ends thereof. The chamber M is also shown as closed at its upper and inner sides but open at its bottom, and as of annular form, so as to leave a central aperture through which the mass of filtering material extends uninterruptedly. The open bottom of the filtered-water chamber M is also shown as covered by a screen which excludes the filtering material from said chamber M. Obviously the location and form of this filtered water chamber may be varied as desired, so long as said chamber communicates with the interior of the filter at such intermediate point. In any case the filtered-water chamber M has an outlet V permitting the filtered liquid to be drawn therefrom as desired.

The base-plate E is formed with a chamber G and also with a channel R R', both opening upward into the space beneath the lower conical screen. An outlet faucet Q communicates with the chamber G, through one side of the wall thereof, and a supply pipe S' delivers into the channel R R' at its lower end. A branch pipe T is connected at its lower end to the supply pipe S' and at its upper end delivers into the space above the upper screen through the side of the top piece or cap D of the filter. A two-way cock S is placed at the junction of the supply pipe with the branch pipe. A second discharge faucet U is connected into the side of the cap D preferably at a point opposite the point of connection of the branch pipe T with said cap.

When the filter is in use, both of the discharge faucets Q and U are kept closed, and the two-way cock S is turned so that the water or other liquid shall be cut off from the branch pipe T and admitted through the supply pipe S' into the lower end of the filter-casing; the liquid flowing upward through the channel R R' and through the lower screen, the filtering material, and the screen which covers the outlet of the filter chamber leading to the chamber M. The course of the liquid is thus upward, and the impurities are consequently separated by the assistance of gravity at the lower part of the filter; such impurities as are arrested by the conical screen settling in the chamber G. Again, the two-way cock S may be turned so as to shut the liquid off from the lower end of the filter and to direct the liquid upward through the branch pipe T. In this event the liquid enters the chamber D' and passes downward through the upper screen and through the upper part of the filtering material, and through the screen which covers the opening at the entrance to the chamber M. Thus constructed the screens which close the ends of the filter chamber may be separately cleansed of matter adhering to their surfaces, and the filtering material within said chamber may be cleansed by a current sent through it in either of two directions.

To clean the lower screen and to remove the impurities from the chamber G beneath said screen, the two-way cock S will be turned so as to deliver liquid into the lower part of the filter casing through the channel R R' and, the discharge faucet Q being opened, the impurities upon the surface of the lower screen will be washed therefrom by the current violently directed against it by the upwardly directed channel R R' and such impurities, together with those previously accumulated in the chamber G, will pass out through the faucet Q. To cleanse the surface of the upper screen the lower faucet Q is closed and the upper faucet U opened. The cock S is then turned to send water through the pipe T into the chamber D'. To cleanse the filtering material, so far as it can be cleansed while in place, and to cleanse the passages in the screens, water or other liquid will be let into the space external to either of the end screens and the faucet leading from the end space adjacent to the other screen will be opened.

The several screens are preferably composed of two outer foraminous plates and an interposed layer of asbestos cloth or similar material. Thus, the lower screen is composed of the conical plates O between which is confined a layer K of asbestos cloth or fiber, and the upper screen of two outer foraminous plates N with an interposed layer K' of asbestos cloth or fiber. The outlet leading from the filter chamber to the chamber M is also shown as composed of two outer foraminous rings L between which is placed a layer K² of asbestos cloth or fiber. The outer margins of the conical screens O are shown turned outwardly in a horizontal plane to abut against the under side of an internal shoulder P' on the lower part of the filter-casing A; a clamping ring P being screwed into the lower end of the casing, beneath the margins of the screens so as to retain the screens in their described position. The margins of the upper screens N rest upon an internal shoulder I' at the upper end of the casing A and are retained in such position by the lower margin of the cap D which depends into the upper end of the casing and presses downward upon the screens. Packing rings I are placed at the juncture of the lower end of the casing A with the bottom piece E. A similar packing ring N' is interposed between the margin of the cap D and that of the upper screen N, and packing rings I² are placed above and below the screens K².

Incidentally to the indicated arrangement of the filtered water chamber M and the screen covering the opening leading thereto, the filter-casing is shown as formed of a lower section B, separably joined about midway of the length of the casing as a whole, the walls of the filtered-water chamber M being formed integrally with the lower end of the upper section B of the casing. This precise arrangement is of course not necessary and the details of construction incident thereto may be changed without departing from my invention.

It is essential to the successful operation of the structure described that the screened openings connecting the chamber M, which forms the outlet or discharge passage with the intermediate chamber shall open from said passage in one direction or at one side of said passage only; it being obvious that if the said chamber M, when arranged as shown in the drawings, had opposite openings in more than one of its walls, the water flowing through the filtering material from one end of the filter to the other, would flow through said passage, and thereby carry into and deposit therein any impurities washed out of the filtering material before reaching the passage. By arranging the screened openings to face in one direction only, either when said opening faces downward as shown, or in any other direction, the water used to wash out or cleanse the filtering material will be prevented from flowing through the outlet passage, but will flow past or around the screened opening, and thus carry all impurities past the same to the end of the filter toward which it may be flowing.

I do not herein claim a filter having end chambers separated from an intermediate space by a screen and each provided with an inlet and one with an outlet, said intermediate space being filled by a continuous mass of filtering material and a central screened outlet adapted for the outward passage only of water from said intermediate space, a filter thus constructed being described and claimed in a separate application for patent, Serial No. 462,503, filed by me simultaneously with the filing of this application.

I claim as my invention—

1. A filter having end liquid chambers, each provided with an outlet, and separated from each other by an intermediate space containing a continuous mass of filtering material, and having between its ends an outlet passage for filtered water, which passage communicates with the intermediate space by a screened opening in position to permit the outward passage only of water from the said space, substantially as described.

2. A filter having end liquid chambers each provided with an inlet and outlet, said chambers being separated by screens from an intermediate chamber containing a continuous mass of filtering material, and said filter also having a filtered-water chamber provided with an outlet and communicating with the filtering chamber between the ends of the latter by means of a screened opening in position to permit the outward passage only of water from the filtering chamber.

3. In a filter, the combination with a filtering chamber, of an annular filtered-water chamber surrounding the filtering chamber and communicating with the latter between its ends through a screened opening, in position to permit the outward passage only of water from the filtering chamber, supply and discharge passages connected with the several liquid chambers, and a discharge leading from the filtered-water chamber, the inlet pipes leading to the several liquid chambers being joined with a valve casing containing a valve having suitable passages to divert the inflow to either of the liquid chambers at pleasure.

4. A filter consisting of a chamber filled with filtering material, the ends of said chamber being inclosed by suitable screens, closed chambers external to the screens each having an inlet and an outlet, and a filtered-water chamber within the filtering chamber and having a screened opening, through which it communicates with said filtering chamber, said opening being in position to permit outward flow only of water from the filtering chamber, said filtered-water chamber being provided with a suitable outlet.

5. The filter described composed of the united shells A and B embracing the annular filtered water chamber M and a foraminous screen forming the bottom of said chamber M; the chambered cap plate D and bottom plate E; the upper and lower screens confined between said cap plates and the adjacent portions of the filter shell; the valve S and pipes leading from the casing of said valve into the end chambers inclosed by said end plates; the faucets leading from said end chambers, and a pipe leading from the filtered water chamber M.

In witness whereof I have hereunto set my hand.

MICHAEL KRAKER.

Witnesses:
L. MEININGER,
JULIUS MEYER.